United States Patent [19]

Potinkara

[11] Patent Number: 5,034,197
[45] Date of Patent: Jul. 23, 1991

[54] REACTOR CHAMBER IN A FLUIDIZED BED REACTOR

[75] Inventor: Matti Potinkara, Raisio, Finland

[73] Assignee: A. Ahlstrom Corporation, Finland

[21] Appl. No.: 470,237

[22] Filed: Jan. 25, 1990

[30] Foreign Application Priority Data

Feb. 8, 1989 [FI] Finland ................................ 890587

[51] Int. Cl.⁵ ...................... F27B 15/06; F27B 15/14; F27B 15/16
[52] U.S. Cl. .................................. 422/146; 34/57 A; 110/245; 165/104.16; 122/4 D; 422/241
[58] Field of Search ............... 422/140, 143, 144, 145, 422/147, 241; 122/4 D; 110/245, 263; 431/7, 170; 165/104.16; 34/57 A

[56] References Cited

U.S. PATENT DOCUMENTS

| | | | |
|---|---|---|---|
| 2,856,905 | 10/1958 | Bowen | 122/4 D |
| 4,124,068 | 11/1978 | Thompson | 122/4 D |
| 4,171,346 | 10/1979 | King et al. | 422/146 |
| 4,312,302 | 1/1982 | Kollerup | 165/104.16 |
| 4,360,339 | 11/1982 | Blaskowski | 122/4 D |
| 4,407,355 | 10/1983 | Bonn et al. | 422/143 |
| 4,635,713 | 1/1987 | Johnson et al. | 165/104.16 |
| 4,714,049 | 12/1987 | McCoy et al. | 122/4 D |
| 4,715,809 | 12/1987 | Langhoff et al. | 431/170 |

Primary Examiner—Robert J. Warden
Assistant Examiner—Amalia L. Santiago
Attorney, Agent, or Firm—Nixon & Vanderhye

[57] ABSTRACT

The present invention relates to the refractory lining covering the lower part of a tube wall in the reactor chamber of a fluidized bed reactor. The upper surface or edge of the refractory lining is provided with a plurality of radial grooves to guide the bed material flowing downwards along the walls so as to decrease its wearing effect at the border line of the refractory lining and the tube walls.

18 Claims, 4 Drawing Sheets

REACTOR CHAMBER IN A FLUIDIZED BED REACTOR

BACKGROUND AND SUMMARY OF THE INVENTION

The present invention relates to a particularly configured reactor chamber in a fluidized bed reactor, the vertical walls of which are principally formed by "water walls", which are shielded in the lower part of the reactor chamber by a refractory lining covering the bottom part of the walls. The present invention is especially related to the refractory lining construction protecting the bottom part of the reactor chamber walls.

The "water walls" are formed by a plurality of heat exchange tubes (through which water flows) formed with external fins. Adjoining tubes are connected to each other at tube/fin interfaces by welding. It is a known practice that both the heat exchange tubes and the fins therebetween at the lower part of the reactor chamber are covered by a refractory lining, extending to the bottom of the reactor chamber. The refractory lining forms a thick layer on the lower part of the reactor chamber walls, which layer protects the walls against heat and erosion. The intense movement of particles in the fluidized bed reactor and the high particle density prevailing especially at the lower part of the reactor chamber create conditions which require exceptionally high wear resistance. The surface of the refractory lining is intended to be made as smooth as possible in the reactor chamber. The refractory lining may continue as a refractory wall in the bottom part of the reactor chamber even if the "water walls" do not extend to the bottom of the reactor chamber.

Fluidized bed reactors are used in many kinds of combustion and heating processes. The bed material being circulated and fluidized in reactors depends upon the process in question The material being fluidized in the combustion processes may be solid fuel, ground or crushed bits of suitable size, such as coal, coke, wood waste or peat. Moreover, the fluidized bed may also be formed of other solid particles such as sand, ash, sulfur absorbent, catalysts or metal oxides.

Both downwardly and upwardly directed particle mass flows are found in the reactor chamber. The absolute mass flow in the reactor chamber varies in radial and axial direction of the reactor chamber, i.e. the mass flow varies with the distance to the wall. The downward mass flow occurs closely adjacent to the exterior walls. As the particle concentration increases in the downward direction, the mass flow increases close to the walls. The downward mass flow may be a layer as thick as 10 to 50 mm or even more. Any change in this mass flow usually generates turbulence, which easily causes erosion on the wall surfaces which is extremely harmful to the heat exchange tubes.

The upper edge of the refractory lining forms a shoulder on the inner wall of the reactor chamber and generates turbulence in the downwardly falling film of particulate bed material. The downward mass flow along the fins between the water tubes accumulates bed material in a heap on the upper edge of the refractory lining between the tubes. The heap guides or causes the particles to flow sideways from the fins, partly along the border line between the heat exchange tubes and the refractory lining. Further, a change in direction of the mass flow generates turbulence at the walls. The above mentioned particle flows cause erosion especially at the heat exchange tubes, close to the border line between the refractory lining and the tubes. The erosion causes problems especially in coal combustors.

The condition of the heat exchange tubes in the combustors must, due to the above mentioned reasons, be checked occasionally and any eroded tubes should be replaced by new ones or re-coated with refractory material. Such measures are time consuming, laborious and expensive.

The above described erosion of heat exchange tubes is a well known problem, and efforts have been made to solve the problem. However, the solutions until today have not been completely satisfactory. For example, the extension of the refractory lining upwards to an area, in which the downward flow is less than in the lower part of the reactor chamber, would decrease erosion, but it would also decrease the heat exchange between the reaction chamber and the water in the tubes.

Experiments have also been made in protecting the tubes at regions which are extremely liable to erosion, by overwelding the surface of such regions. This overwelding does not, however, last a very long time and it must be renewed from time to time as a result of erosion. It has also been suggested that the tubes could be covered by a wear-resistant material, for example, by sintered metals or ceramic materials. This is, however, a very expensive solution and therefore not practical.

Furthermore, it has been suggested that the flow rate of the downward mass flow could be reduced by attaching studs or other obstacles to decrease the flow velocity on the chamber walls. For example, the Swedish patent SE 454,725 suggests that curved segments might be attached on the tubes at regions which are most liable to erosion. A high mass flow rate is, however, an advantage in heat exchange and it should not unnecessarily be reduced.

Moreover, Swedish patent 452,360 suggests an extraordinary solution, in which the walls of the reactor chamber have been arranged inclined throughout the whole length in such a way that the walls are inwardly inclined towards the upper part of the reactor chamber.

The object of the present invention is to produce an improved reactor chamber in a fluidized bed reactor, in which the erosion adjacent to upper part of the refractory lining has been minimized.

This objective is achieved according to the invention by forming grooves in the upper edge of the refractory lining adjacent the fins connecting the tubes. The grooves guide the bed material flowing down along the fins so that it continues to flow mainly directly downwards along the refractory lining, instead of flowing partly sideways from the fins along the border line between the tubes and the upper edge of the refractory lining. Now, the bed material flowing downwards along the tubes flows at least partly sideways into the grooves formed in the refractory lining and thereafter, further downwards along the refractory lining. In prior art embodiments, the bed material has caused erosion of tubes at the border line between the tubes and the refractory lining. Now the particle flows are guided in such a way that the harmful flow along the border line and turbulence decreases by diversion through the grooves.

The refractory lining advantageously forms a "grooved shoulder" at the upper part of the refractory lining, the upper surface of which is downwardly inclined, and forms an angle of 30° to 60°, normally about 45°, with the tube wall. The grooves in the refractory lining are advantageously also downwardly inclined. The walls of the grooves may be either vertical or inclined toward each other, thus forming an approximately V-shaped cross section.

The upper surface of the refractory lining may, under exceptionally erosion circumstances, be covered by a material which is especially resistant to erosion. The upper surface may also be treated so as to make it more resistant to erosion.

Additional objects and advantages of the present invention will become apparent from a detailed description of the invention which follows.

DETAILED DESCRIPTION OF THE DRAWINGS

Figure 1:
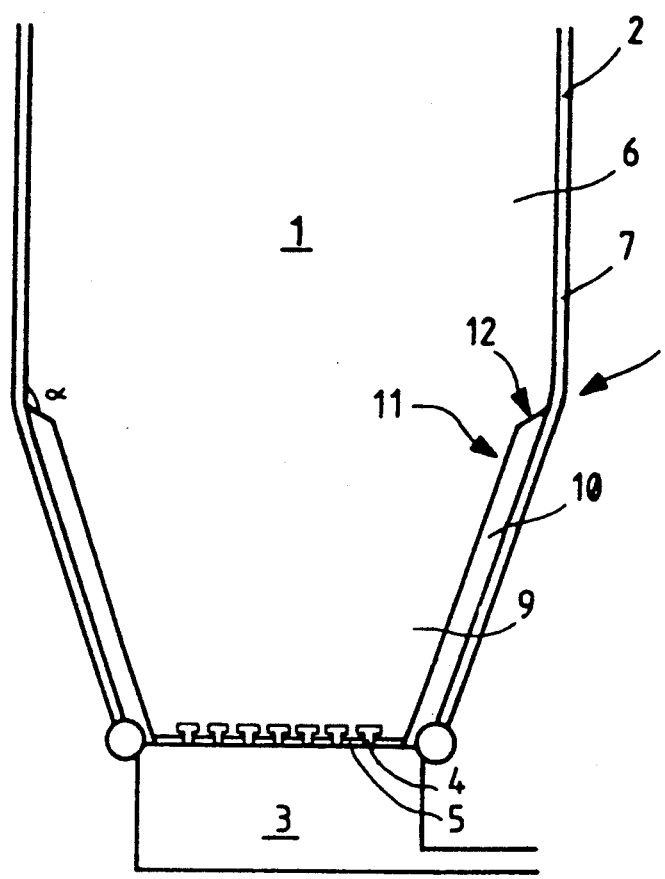
FIG. 1 is a schematic vertical section of an embodiment in accordance with the present invention.

FIG. 1 illustrates a fluidized bed reactor comprising a reactor chamber 1 provided with vertical walls 2. An air box 3 has been installed beneath the reactor chamber 1, from which nozzles 4 guide fluidizing gas, such as air, into the reactor chamber. The air nozzles have been installed on a nozzle plate 5 forming the bottom of the reactor chamber.

Figure 4:
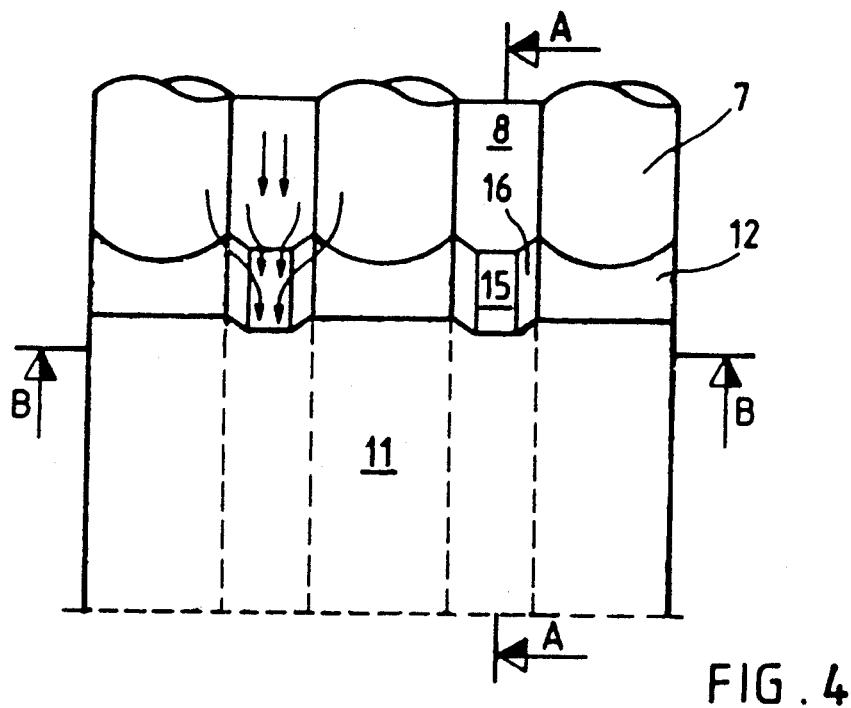
FIG. 4 is a schematic front view of the upper part of the refractory lining in accordance with an embodiment of the present invention.

The walls in the upper part 6 of the reactor chamber are formed by heat exchange (water) tubes 7, which as can be seen in FIG. 4, are connected with each other by fins 8. The "water walls" are covered by a refractory lining 10 at the lower part 9 of the reactor chamber. The upper end 11 of the refractory lining has been formed in such a way that the upper surface or edge 12 of the lining forms a downwardly and inwardly inclined surface. The upper surface or edge 12 of the refractory lining forms an angle of about 135° with the wall above the surface. The angle may be chosen according to the conditions in the reactor and the bed material in such a way that an optimal flow of the bed material in the downward direction is achieved at the upper part of the refractory lining. Advantageously, the upper surface or edge of the refractory lining is inclined to approximate the angle of repose of the bed material, such as sand.

Figure 2:
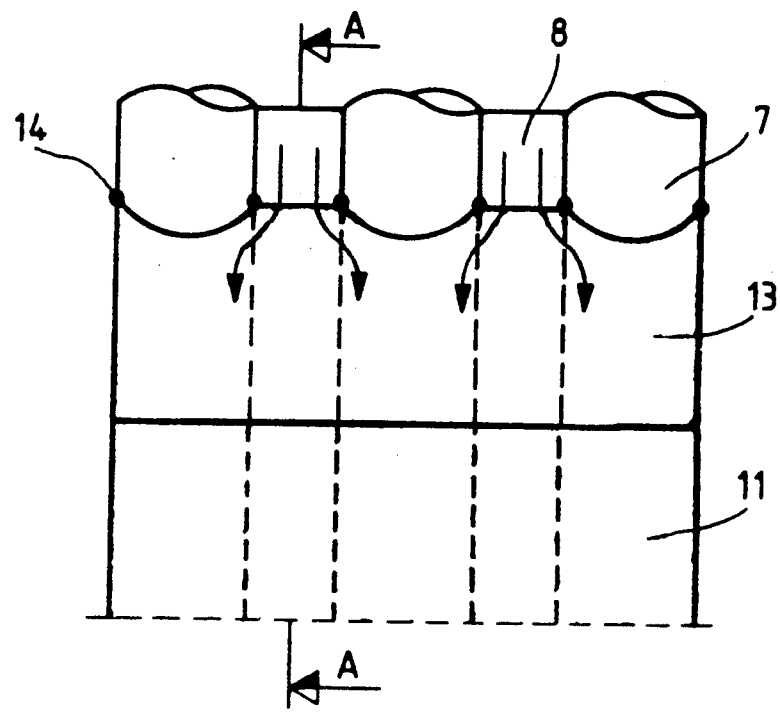
FIG. 2 is a schematic front view of the upper part of the refractory lining in accordance with the prior art.
Figure 3:
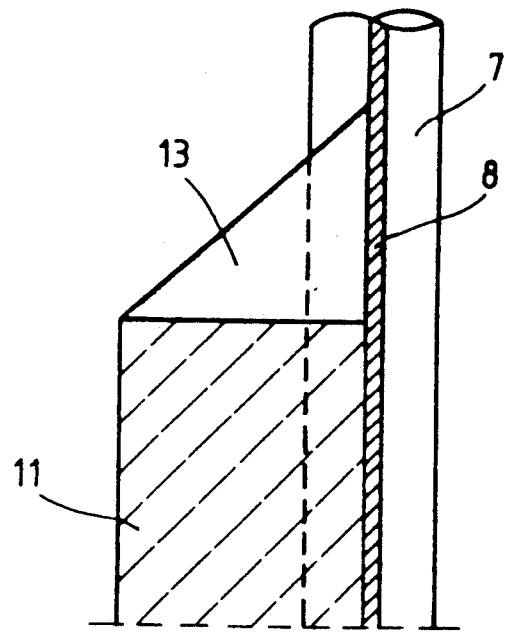
FIG. 3 is a schematic sectional view of FIG. 2 along line A—A.

FIGS. 2 and 3 schematically illustrate the upper part of the refractory lining 11 in accordance with prior art. The refractory lining forms an almost perpendicular angle with the tube wall, whereby sand accumulates to form a sand heap 13 on top of the upper part of the refractory lining. Consequently the particle flow downwards along the fins 8 continues to flow as shown by the arrows, when hitting the sand heap along the tubes, abrading the tubes and causing erosion at regions 14.

Figure 5:
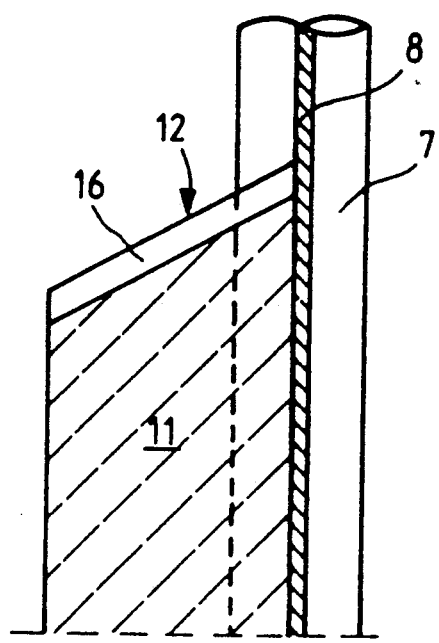
FIG. 5 is a sectional view of FIG. 4 along line A—A.

FIGS. 4 and 5 schematically illustrate respectively the upper part of the refractory lining in accordance with the present invention. The upper surface or edge 12 of the refractory lining is formed to be downwardly inclined. Approximately radial grooves 15 have been formed at the fins 8, into which the downward flowing bed material flows when reaching the refractory lining. The radial grooves are advantageously downwardly inclined to substantially the same extent as the upper surface 12 of the refractory lining. The material flowing downwards from the grooves 15 is further guided downwards along the refractory lined surface but does not substantially come into contact with the tubes 7, as in the apparatus of the prior art. The material flowing downwards along the water tubes is radially guided away from the tubes at the upper junction point of the refractory lining. In accordance with this invention, the bed material flowing downwards along the walls and into the grooves in the refractory lining, thus decreasing the flow and possible turbulence at the border lines of the refractory lining and the water tubes, and thus minimizing wear and erosion.

Figure 6:
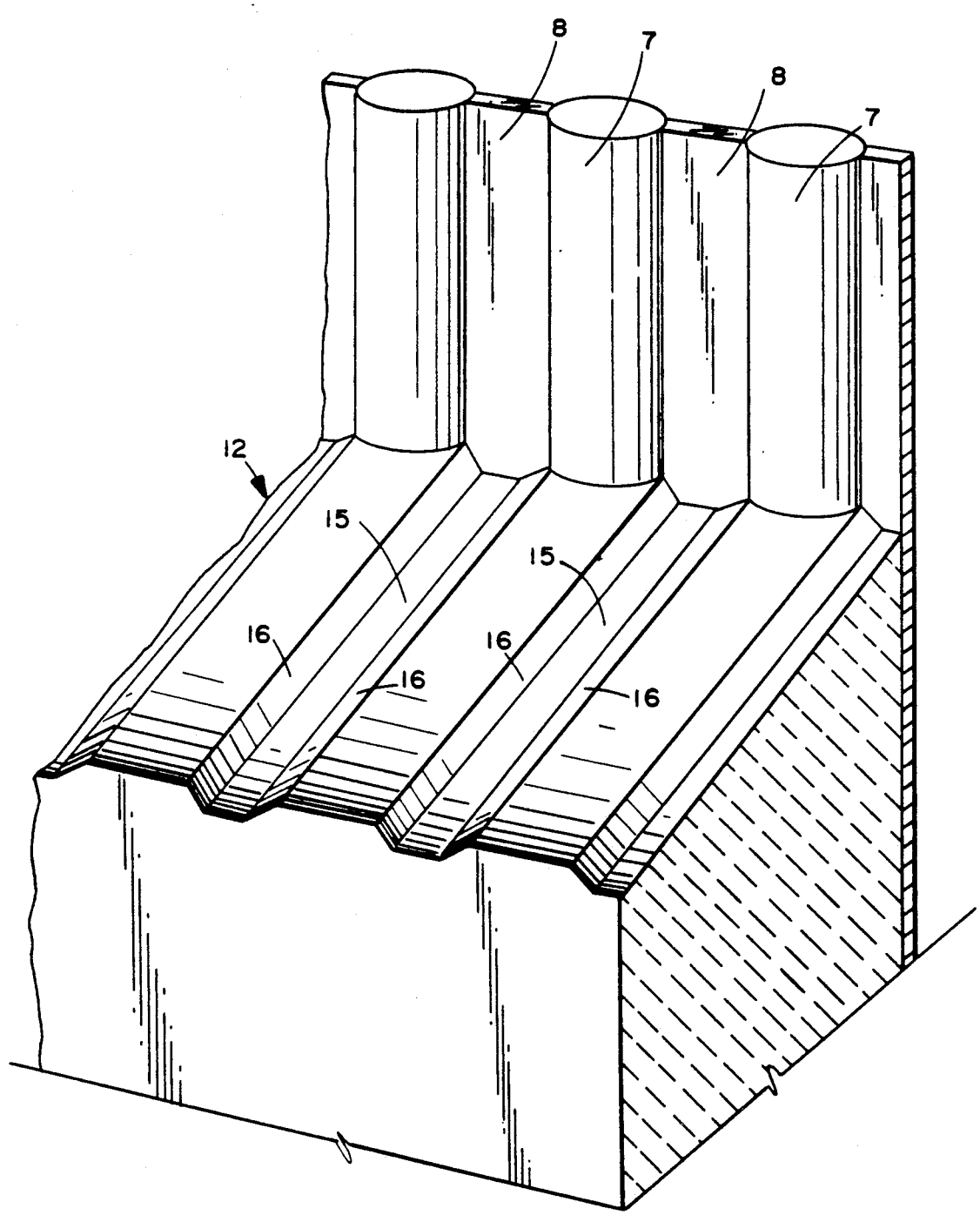
FIG. 6 is a partial perspective view of the upper part of the refractory lining in accordance with the present invention.

While the grooves 15 in the refractory lining are advantageously formed with inclined side walls 16 as illustrated in FIG. 6, the grooves may also have, if desired, vertical side walls, i.e., substantially parallel side walls extending substantially perpendicularly to the groove bottom walls.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluidized bed reactor comprising a reactor chamber defined in part by vertical walls formed by a plurality of adjacent substantially vertically oriented heat exchange tubes joined together by substantially vertical connecting portions extending therebetween which create natural flow paths for particles in the fluidized bed reactor, a lower portion of said walls having a refractory lining applied thereto, said lining having an upper edge formed with a plurality of longitudinally oriented grooves therein in substantial vertical alignment with said vertical connecting portions, said grooves being formed in said upper edge and inclined toward a lower part of said reactor chamber to facilitate downward flow of the particles and to minimize turbulence at the upper end of the refractory lining where said tubes and said refractory lining are joined.

2. A fluidized bed reactor according to claim 1 wherein said upper edge of said lining is downwardly and inwardly inclined.

3. A fluidized bed reactor according to claim 2 wherein said upper edge of said lining forms an angle of about 30° to 60° with said vertical heat exchange tubes.

4. A fluidized bed reactor according to claim 2 wherein said grooves form an angle of about 30° to 60° with said vertical heat exchange tubes.

5. A fluidized bed reactor according to claim 1 wherein said grooves form an angle of about 30° to 60° with said vertical heat exchange tubes.

6. A fluidized bed reactor according to claim 1 wherein said vertical connecting portions comprises fins extending between said heat exchange tubes.

7. A fluidized bed reactor according to claim 1 wherein said upper edge is inclined towards a center of the reactor.

8. A fluidized bed reactor according to claim 1 wherein said lower portion of said walls is downwardly convergent.

9. A fluidized bed reactor according to claim 1 wherein the grooves are covered with a material strengthening the refractory lining.

10. A fluidized bed reactor according to claim 1 wherein the surface of the refractory lining at said grooves is covered by material intensifying wear resistance of said refractory lining.

11. A fluidized bed reactor comprising a reactor chamber defined in part by at least one substantially vertical wall formed by a plurality of tubes connected to each other by means of fins extending along the tubes, a lower portion of said vertical wall having a refractory lining applied thereto, said lining having an upper edge downwardly inclined relative to said vertical wall and having a plurality of grooves formed in said edge in substantial vertical alignment with said fins for facilitating, in use, particle flow downwardly along said substantially vertical wall from said fins onto said refractory lining.

12. A fluidized bed reactor according to claim 11 wherein said upper edge is inclined downwardly at an angle of about 30° to 60° relative to said vertical wall.

13. A fluidized bed reactor according to claim 11 wherein said grooves are each formed by a bottom wall and a pair of side walls.

14. A fluidized bed reactor according to claim 13 wherein said pair of side walls are inclined relative to each other.

15. A fluidized bed reactor according to claim 13 wherein each of said groove bottom walls is substantially parallel to said upper edge.

16. A fluidized bed reactor according to claim 12 wherein said grooves are each formed by a bottom wall and a pair of side walls.

17. A fluidized bed reactor according to claim 16 wherein said pair of side walls are inclined relative to each other.

18. A fluidized bed reactor according to claim 16 wherein each of said groove bottom walls is substantially parallel to said upper edge.

* * * * *